Inventor
LEO V. JACOBSON
By *[signature]*
Attorney

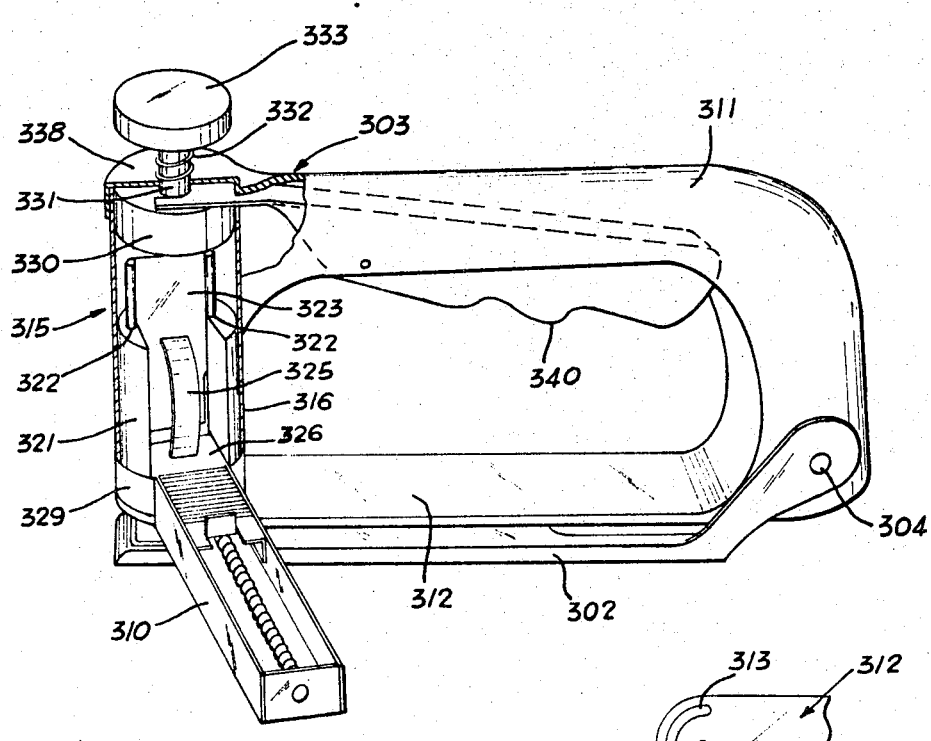
FIG. 9
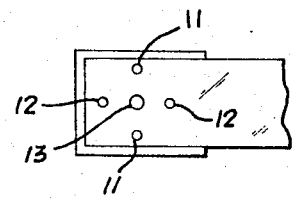
FIG. 10
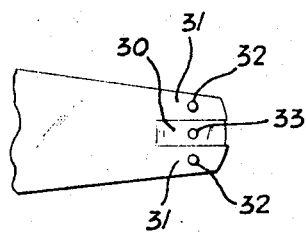
FIG. 2
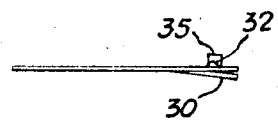
FIG. 3
FIG. 4
Inventor
LEO V. JACOBSON
By
attorney June 24, 1969  L. V. JACOBSON  3,451,606
STAPLER Filed Feb. 4, 1966  Sheet 3 of 5

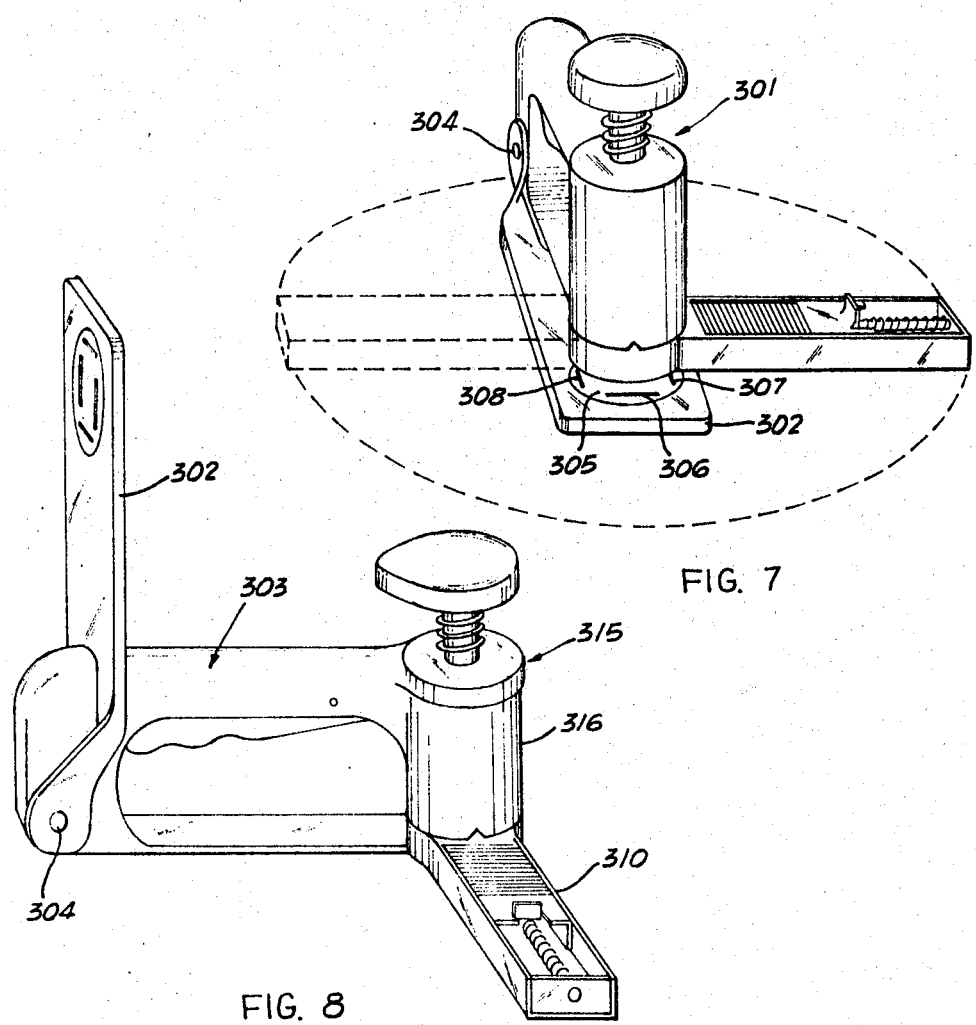

United States Patent Office 3,451,606
Patented June 24, 1969

3,451,606
STAPLER
Leo V. Jacobson, 10664 Carroll Wood Way,
St. Louis, Mo. 63128
Filed Feb. 4, 1966, Ser. No. 525,217
Int. Cl. B25c 5/02, 5/06
U.S. Cl. 227—110                                          3 Claims

ABSTRACT OF THE DISCLOSURE

A portable stapler having a base and an arm hinged together and a staple holding magazine mountable on and above the arm in more than one operative position. A pivot is provided through the arm and the staple holding magazine, behind a staple driving blade. Slots adjacent the pivot allow the pivot to move relative to dimples, which hold the staple holding arm in each operative position.

BACKGROUND OF THE INVENTION

This invention relates to staplers. It has particular application to portable staplers.

Portable staplers now available commercially consist essentially of a light base, at one end of which is a staple clinching anvil and at the other end of which are fixed hinged knuckles, generally supporting a pintle. An arm, generally having a staple magazine integral with it is hinged at one end, to the pintle carried by the base knuckles. A driving head is mounted on the other end of the hinged arm. In such a stapler, a staple can be driven by the head in only one, fixed orientation with respect to the hinge axis.

One of the objects of this invention is to provide a portable stapler which is capable of driving staples in more than one position relative to a base hinge.

Another object is to provide such a stapler which is simple and economical to produce, rugged, effective, and simple to use, and capable of performing tasks impossible to perform with presently known portable staplers.

Other objects will become apparent to those skilled in the art in the light of the following description and accompanying drawings.

SUMMARY OF THE INVENTION

In accordance with this invention, generally stated, a stapler is provided which includes a driving head, a staple-holding magazine, an arm supporting the driving head and staple-holding magazine, a base to which the arm is hinged, and means for supporting the staple-holding magazine in more than one operative position relative to the hinge.

In the preferred embodiment, the magazine is pivotally mounted on the outer end of the arm, so that the magazine can be positioned either parallel with the arm or at right angles to it. If desired, it can easily be arranged to hold the magazine at some intermediate position as well. An anvil is provided with clinching means either permanently or movably positioned in positions complementary to those which the arm is to be moved for stapling.

BRIEF DESCRIPTION OF THE DRAWING

In the drawing.

FIGURE 2 is a fragmentary top plan of an end of a magazine-supporting arm of the stapler shown in FIGURE 1;

FIGURE 3 is a fragmentary view in side elevation of the end shown in FIGURE 2;

FIGURE 4 is a fragmentary bottom plan view of an end of a magazine of the stapler shown in FIGURE 1;

FIGURE 7 is a view in perspective of another embodiment of stapler of this invention;

FIGURE 8 is a view in perspective of the stapler of FIGURE 7, in condition to use as a tacker;

FIGURE 9 is a view in perspective with parts broken away to show the interior mechanism of the stapler shown in FIGURES 7 and 8;

FIGURE 10 is a fragmentary top plan view of an end of a lower span of a magazine-supporting arm of the stapler shown in FIGURES 7–9;

DESCRIPTION OF THE PREFERRED EMBODIMENTS

Figure 11:
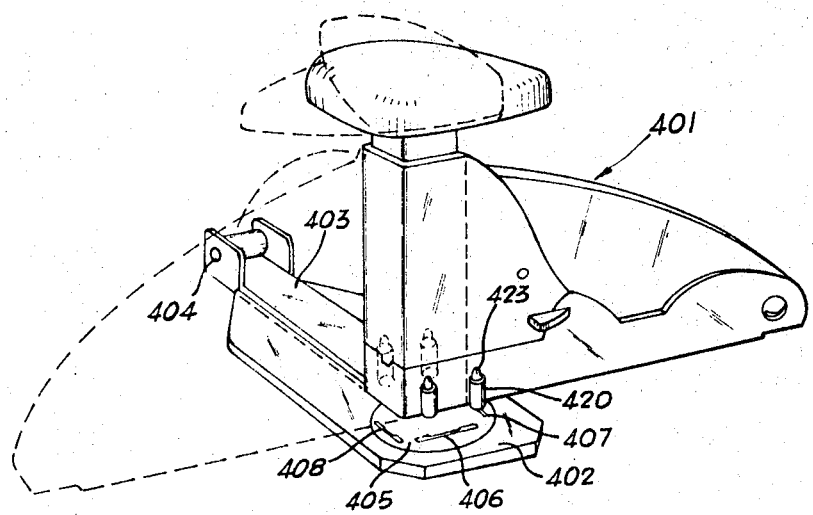
FIGURE 11 is a view in perspective of still another embodiment of stapler of this invention.
Figure 1:
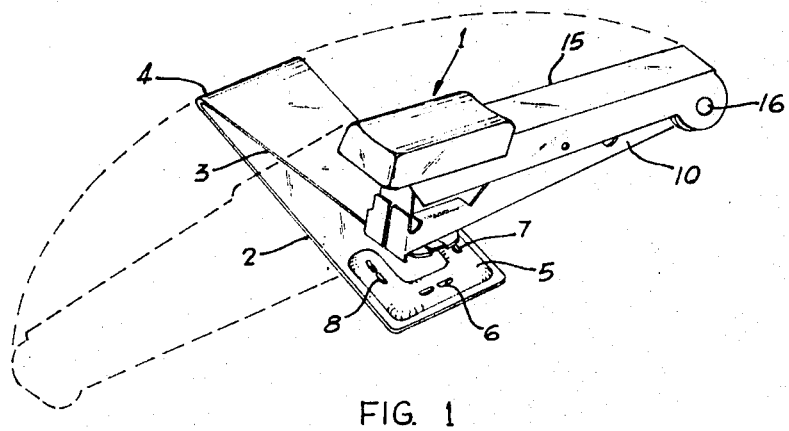
FIGURE 1 is a view in perspective of one embodiment of stapler of this invention.

Referring now to the drawing, and particularly to FIGURES 1–4, for the preferred embodiment of stapler of this invention, reference numeral 1 indicates an assembled stapler which includes a base 2, an arm 3, hinged integrally on the base 2 along a hinge axis defined by bend 4, a horseshoe shaped anvil 5, with three clinching stations 6, 7 and 8 respectively, a staple-holding magazine 10, pivotally mounted at the outer end of the arm 3, and a stapling head 15, hingedly mounted on the magazine 10.

In this illustrative embodiment, the anvil 5 is integral with the base 2, being embossed upwardly from the metal of the base. The clinching stations 7 and 8 are parallel with one another and are perpendicular to the clinching station 6, which is in the conventional position with respect to the hinge axis of an ordinary stapler. At the outer end of the arm 3, the arm is slit, bent, and heat-treated to provide, integrally with the arm 3, a central pivot area 30, and two detent spring fingers 31. Each of the spring fingers 31 has a detent point 32 struck up in it. The central pivot area 30 has a pivot receiving hole 33 in it.

The staple magazine 10 is essentially an open-topped, shallow metal box, and is entirely conventional except for the provision on the underside near the staple-driving end thereof, of a pivot pin receiving hole 13, and detent dimples 11 and 12. The dimples 12 are aligned with the long axis of the magazine, and the dimples 11 are aligned at right angles thereto. Both sets of dimples are spaced and arranged with respect to the hole 13 in such a way as to receive the detent points 32 at the three stapling positions of the magazine 10.

A pivot pin 35 extends through the holes 13 and 33 and is headed, peened or otherwise secured in such a way as to permit the magazine 10 to rotate, and, by drawing the center section 30 and the spring fingers 31 into substantially the same plane against their respective biases, to provide firm support for the magazine and spring detents which hold the magazine 10 in proper orientation with respect to a selected clinching station.

The stapling head 15 is entirely conventional, but it is hinged directly and only to the magazine 10, by means of a pintle 16. The stapling head 15 has, at its end opposite the pintle 16, a driver blade, sliding in a guide channel in an entirely conventional manner.

In the operation of this embodiment of stapler, the stapler magazine 10 will normally be oriented with its own long axis parallel with the long axis of the arm 3. It is held in this position by the projecting of the detent points 32 into the dimples 11 on the underside of the magazine 10. If it is desired to drive staples at right angles to the station 6, i.e., parallel with the long axis of the arm 3, it is only necessary to rotate the magazine 10 about the pivot pin 35, through 90°, until the detent points 32, which have been displaced from the dimples 11 by the twisting of the magazine 10, snap into the dimples 12, which signals the proper positioning of the magazine and injecting head with respect to the clinching station 7 or 8, depending upon which way the magazine was turned. The gauge and temper of the steel from which the base and arm are made, in this embodiment, and the width of the arm 3, are such that the arm 3 acts as its own spring, of a strength sufficient to keep the end of the arm spaced from the anvil to receive whatever is to be stapled, but of a flexibility to permit the end of the magazine to engage the material being stapled as the staple is driven through the material onto the anvil.

Figure 5:
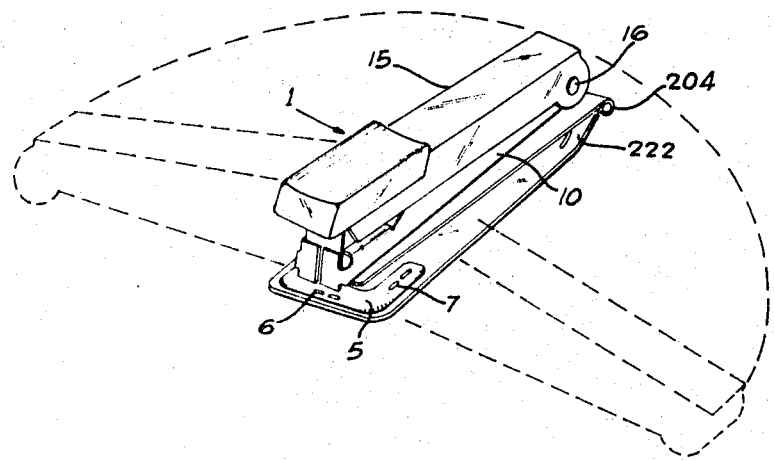
FIGURE 5 is a view in perspective of another embodiment of stapler of this invention.
Figure 6:
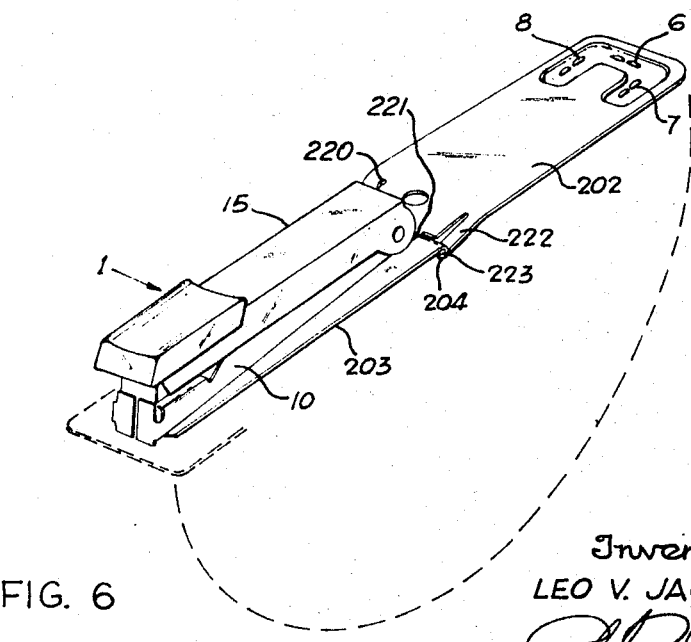
FIGURE 6 is a view in perspective of the stapler of FIGURE 5, in condition for use as a tacker.

It can be seen that a conventional hinging arrangement, with an auxiliary spring, can be used to hinge the arm 3 to the base 2. A modified form of such arrangement is shown in FIGURES 5 and 6. In this embodiment, everything is identical with the embodiment shown in FIGURES 1–4 except for the hinging and springing arrangement. A base 202 is made separately from an arm 203. The arm 203 has a pair of spaced knuckles 204 at one end. The base 202 has, integral with it at one end, a hinge leaf 220 with a knuckle 221 at its free end. The knuckles 204 and 221 are hingedly connected by means of a hinge pin 223. Integral with the base 202, and lying at either side of the hinge leaf 20, are spring elements 222, curved with their free ends extending above the base to bear on the underside of the arm 203 when the device is in stapling position, as shown in FIGURE 5. With this arrangement, the base 202 can be swung away from the magazine, so that the magazine and stapling head can be used as a tacker. Even as a tacker, the magazine can be swung about the vertical pivot, to any desired position.

Referring now to FIGURES 7–10 for still another embodiment of stapler of this invention, reference numeral 301 indicates a stapler-tacker with a base 302, an arm 303, hinged to the base 302 on a horizontal pintle 304, an anvil 305 with clinching stations 306, 307 and 308 at one end of the base, a magazine 310 carried by the arm 303, and a stapling head 315 also carried by the arm 303. In this embodiment, the stapling head 315 includes a hollow cylindrical housing 316 which is connected to and when assembled forms a part of the arm 303. It also includes a driver blade 323 mounted in channels 322 in guide segments 321 connected to an inner end of the magazine 310 and fitting closely but rotatably within the housing 316, as shown particularly in FIGURE 9. A spring 325, with one end mounted on a bridging piece 326 across the end of the magazine 310 between the segments 321, and with its other end mounted in the web of the blade 323, biases the blade 323 in a direction away from the magazine. The stapling head 315 also includes a blade pusher 330, in the form of an axially thick disk, a pusher stem 331 which extends upwardly through a hole in the top of the housing 316 from the center of the disk 330, a knob 333 on the upper end of the stem, and a helical compression spring 332 mounted around the upper end of the stem and seated at one end on the top of the housing 316 and at its other end on the underside of the knob 333.

The inner end of the magazine 310 is provided with a bearing boss 329 the radial upper surface of which bears against the bottom edge of the housing 316. The bottom edge of the housing 316 is notched at three intervals, spaced 90° apart, which, with a wedge shaped click on the upper surface of the boss 329, serve as locating detents, as illustrated in FIGURES 7 and 8.

The arm 303 of this embodiment has an upper span 311, and a lower span 312. The lower span 312 is essentially a flat plate, with a rounded outer end to conform to the configuration of the housing and the magazine boss, and is provided with a staple admitting, arcuate slot 313, and a magazine-mounting pivot stud 314, the other end of which is seated in a socket in the underside of the boss area of the magazine. The stud 314 helps to locate and steady the lower span 312 and magazine with respect to one another, since the chief bearing function for the rotating magazine is performed by the guide segments 321 secured to the bearing boss 329 and journaled in the cylindrical housing 316, as shown in FIGURE 9.

The upper span 311 of the arm 303 is inverted U-shaped in cross-section through most of its length, opening downwardly toward the lower span 312, and has integral with it at its outer end a cap element 338 which forms the top of the housing 316. The stapler is shown as provided with an operating lever 340 pivotally mounted between the legs of the U-shaped upper reach 311, with a yoke, extending through an axial slot in the upper end of the housing 316 and over the top of the disk 330. The operating lever 340 is chiefly used when the stapler is used as a tacker, to provide for one-handed operation.

In the assembly of the stapler of this embodiment, the arm 303 can be assembled to the base 302, and the lever 340 can be assembled in the arm 303. The disk 330, spring 332, post 331 and knob 333 can then be assembled in the condition shown in FIGURE 9, one of the knob and disk being mounted after the other elements are in place. The magazine 310, the blade 323, and the spring 325 can then be assembled, slipped into the open lower end of the open ended cylindrical housing 316, and the housing fitted into the cover 338, by springing the lower span 312 of the arm 330 away from the upper span 311 to permit the bottom of the magazine to clear. The span 312 is then permitted to spring back into position with the stud 314 in the socket in the underside of the magazine 310. If it is desired to do so, the housing 316 can be soldered or otherwise secured to and within the compass of the flanges of the cover 338.

In operation, the magazine 310 is merely turned to the orientation desired, the alignment with a clinching station being signalled by the engagement of the click on the magazine boss in a notch in the housing. One can then either push down on the knob 333 or pull up on the lever 340 to depress the driving disk 330, forcing the blade 323 downwardly to drive a staple from the magazine 310 in the conventional fashion.

Referring now to FIGURE 11, for still another illustrative embodiment of this invention, reference numeral 401 indicates a stapler with a base 402 and an arm 403 hinged to the base 402 by means of a horizontal pintle 404. The base 402 has, at its end opposite the pintle 404, an anvil 405, with clinching stations 406, 407 and 408.

A conventional magazine and driving head are detachably mounted on the arm 403 by means of four sleeves 420, secured to the outside of the magazine-driving head assembly, and fitting on four pins 423 projecting upwardly from the arm 403. In this embodiment, the magazine-drive head assembly is merely slipped upwardly off the pins 423, turned to the desired position over a clinching station, and replaced on the pins.

Figure 12:
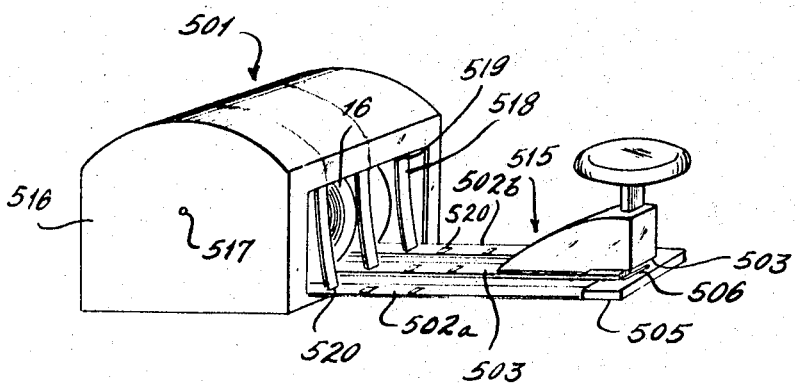
FIGURE 12 is a view in perspective of still another embodiment of stapler of this invention.
Figure 13:
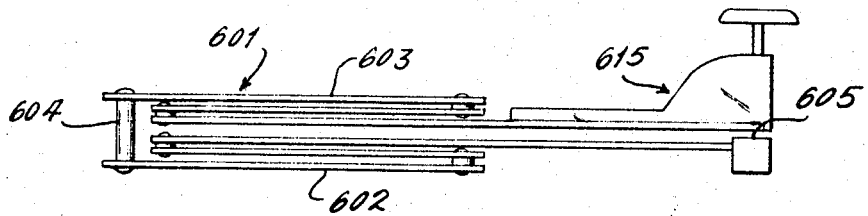
FIGURE 13 is a view in perspective of still another embodiment of stapler of this invention.

Numerous variations in the construction of stapler of this invention, within the scope of the appended claims, will occur to those skilled in the art in the light of the foregoing disclosure. For example, to make the magazine movable laterally rather than rotationally with respect to the hinge, in the embodiment shown in FIGURE 12, the magazine section 515 is mounted on a flexible steel tape-like arm 503, which can be rolled up inside a case 516 after the manner of steel tapes, and the anvil 505 is carried between steel tapes 502a and 502b mounted in cases 515a and 516b on either side of the magazine-carrying tape case. The tapes can be connected to a common shaft 517 inside the cases, if desired. To give more positive alignment of the clinching station 506 with the end of the magazine at a number of operative positions, pawl bars 518 may be attached to the cases 516, 516a, and 516b by hinges 519, for engaging slots 520 in the tapes 503, 502a and 502b. As shown in FIGURE 13, the base 602 and arm 603 can be made in hinged sections like those of a carpenter's rule, so as to be extensible from a hinge post 604 on which they are slidably mounted in increments. The magazine section 615 and anvil 605 are thereby kept in alignment. In the embodiments in which the magazine is pivotally mounted to the arm, arrangement can be made to index a movable anvil, so as to make it possible to drive staples at any desired angle through at least 180°. These are merely illustrative examples of variations.

Having thus described the invention, what is claimed and desired to be secured by Letters Patent is:

1. A stapler comprising a staple-holding magazine, an arm supporting said staple-holding magazine, a base, a staple clinching anvil carried by said base, said base and said arm being joined by a hinge means, said base and said arm being extensible and retractable with respect to said hinge means.

2. A stapler comprising a base, a resilient arm hinged to said base, a staple holding magazine pivotally connected to said resilient arm for rotational movement of said magazine to a plurality of operative positions, and detent means operatively connected to said staple holding magazine for holding said magazine selectively in each of said operative positions, at least a portion of said resilient arm being adapted to be bent against its bias by said detent means when said magazine is moved from one of said operative positions to another of said operative positions.

3. A stapler comprising a base; a staple clinching anvil carried at a forward end of said base; an arm hingedly connected to said base at a rearward end of said base; a magazine assembly comprising a staple-holding magazine and a driver blade at a forward end of said magazine for driving a staple carried by said magazine, said magazine assembly overlying said arm; a pivot joining said arm and said magazine assembly at a position on said magazine assembly behind said driver blade; a detent means on said arm; and a discontinuity in said arm between said pivot and said detent means, whereby a portion of said arm carrying said pivot and a portion of said arm carrying said detent means are deformable relative to each other.

References Cited

UNITED STATES PATENTS

| 252,841 | 1/1882 | McGill | 227—155 |
| 1,586,583 | 6/1926 | Skrebba. | |
| 2,358,463 | 9/1944 | Masters | 227—110 |
| 2,922,163 | 1/1960 | Smick | 227—110 |

TRAVIS S. McGEHEE, *Primary Examiner.*

U.S. Cl. X.R.

227—120